July 15, 1941.  H. M. DANKER  2,249,555
FERTILIZER COLLECTING APPARATUS
Original Filed July 20, 1939   2 Sheets-Sheet 1

Inventor:
Hugo M. Danker
By: Milo B. Stevens & Co.
Atty's

July 15, 1941.  H. M. DANKER  2,249,555
FERTILIZER COLLECTING APPARATUS
Original Filed July 20, 1939   2 Sheets-Sheet 2
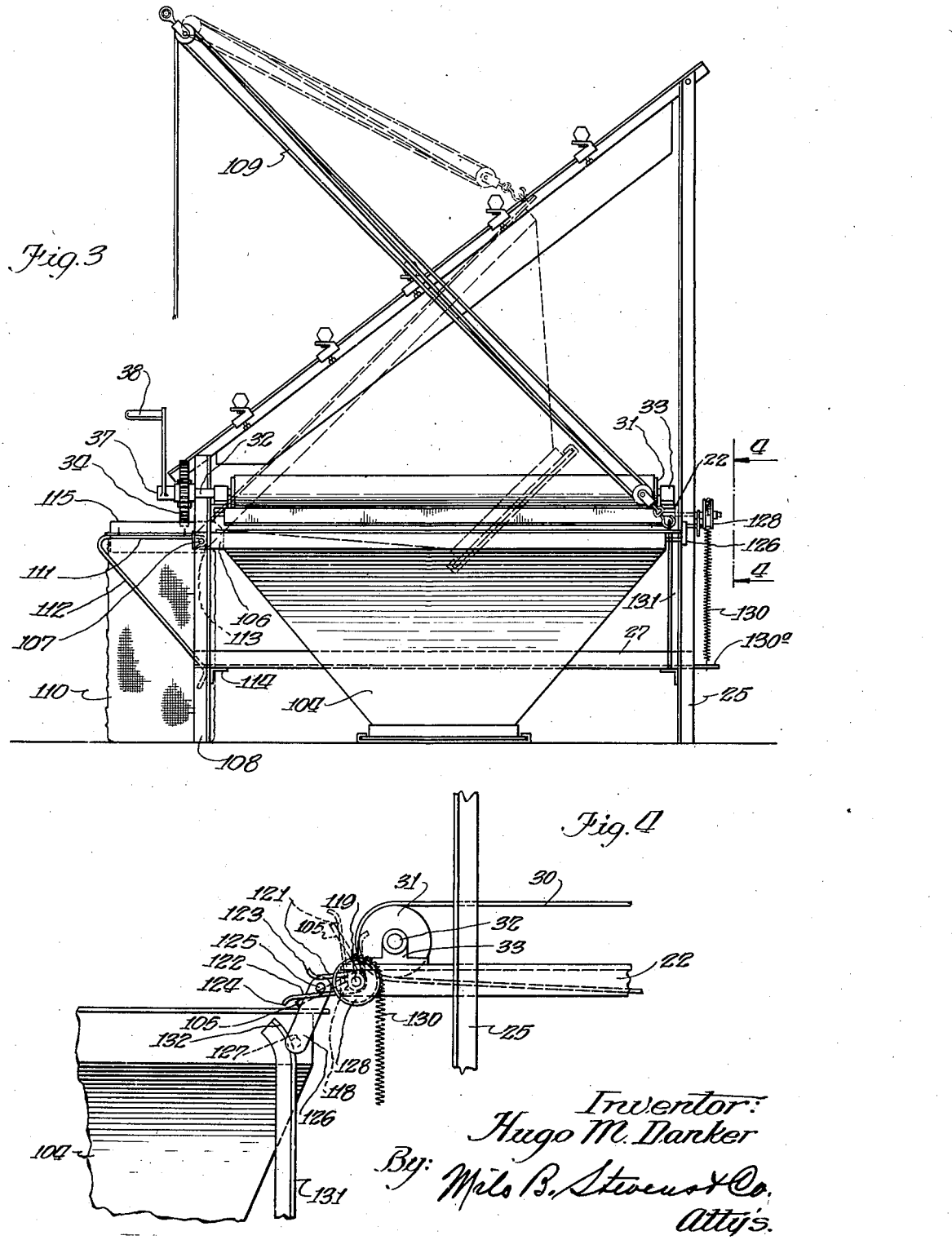

Patented July 15, 1941

2,249,555

UNITED STATES PATENT OFFICE 2,249,555

FERTILIZER COLLECTING APPARATUS

Hugo M. Danker, Berwyn, Ill.

Original application July 20, 1939, Serial No. 285,608. Divided and this application March 28, 1940, Serial No. 326,511

1 Claim. (Cl. 214—91)

My invention relates to apparatus for compounding and preparing fertilizer, and more particularly to a fertilizer collecting unit forming a part of such apparatus, the present application being a division of one filed by me on July 20, 1939, under Serial No. 285,608.

One object of the invention is to provide a collecting unit which is immediately adjacent to the discharging zone of the prepared fertilizer, in order to be compactly grouped therewith.

A further object of the invention is to include a transfer device for the fertilizer delivery which leads into the collecting unit, but is automatically caused to clear the same when the unit is moved to a discharging position.

Another object of the invention is to design a collecting unit with means to transfer its contents to bags or other containers in which the fertilizer is to be delivered or sold.

With the above objects in view and any others which may suggest themselves from the description to follow, a better understanding of the invention may be had by reference to the accompanying drawings, in which—

Fig. 3 is a side view of Fig. 1, from the right; and

Fig. 4 is a magnified fragment of Fig. 3, as viewed from the line 4—4.

Figure 1:
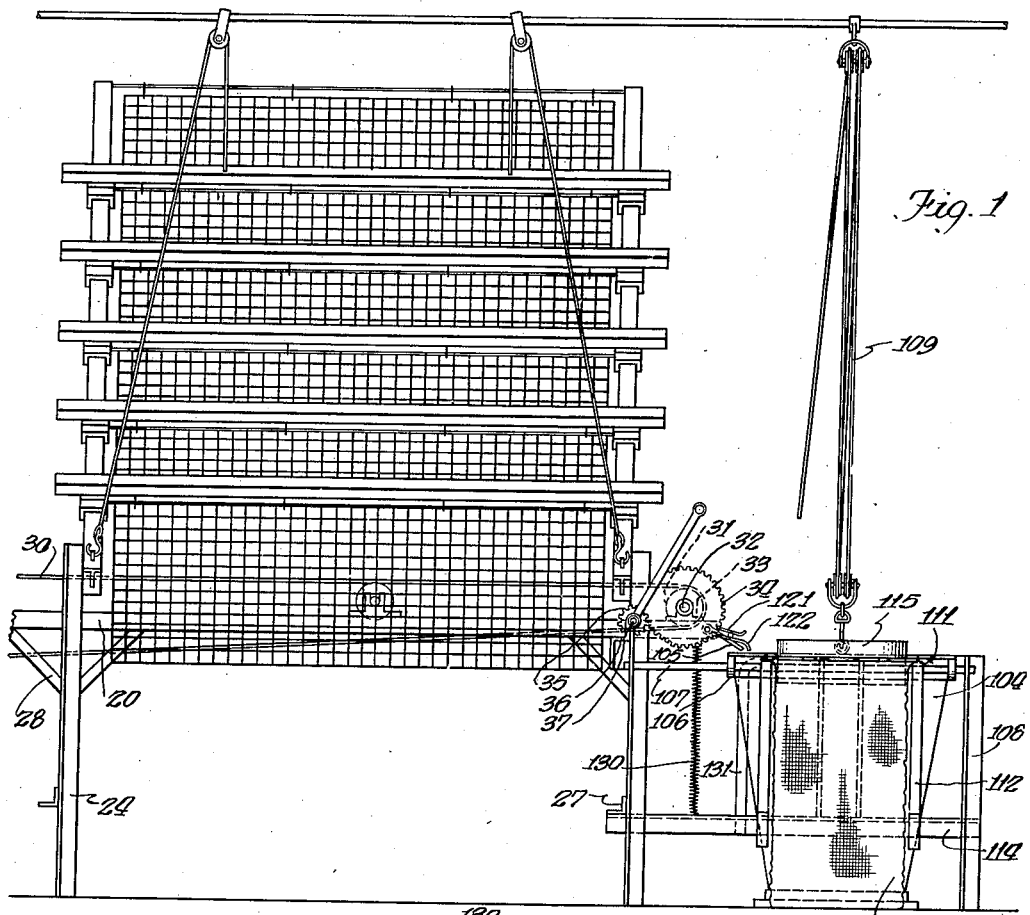
Fig. 1 is an elevation of the discharging portion of the fertilizer preparing apparatus, showing the collecting unit.

In accordance with the foregoing, specific reference to the drawings shows the framework of the apparatus to be of skeleton form, and largely composed of angle bars. Thus, a frontal rail is indicated at 20, a rear rail at 22, frontal uprights at 24, rear uprights at 25, upper spacers at 26, and lower spacers at 27. Braces are used wherever necessary, such as indicated at 28.

The framework primarily supports a horizontal conveyor belt 30 trained over terminal rollers 31 whose shafts 32 are carried in suitable frame bearings 33. One of the shafts 32 receives a gear 34 with which a pinion 35 carried by a frame bracket 36 is in mesh. The pinion shaft 37 carries a crank handle 38 and provides a reduction drive for the same to operate the belt.

The conveyor belt 30 is intended to receive on its upper run a layer comprising a mixture of ingredients calculated to produce a fertilizer of highly desirable qualities; and the operation of the crank handle 38 in the counter-clockwise direction—as seen in Fig. 1—is intended to discharge the said layer into a large receptacle 104 from which the accumulated contents are transferred to bags or other containers for use or sale.

The receptacle 104 is somewhat beyond the end of the conveyor, and an apron 105 is therefore provided for the transfer of the material from the conveyor into the receptacle without loss. The receptacle is spaced from the conveyor as mentioned in order that it may have clearance to be swung from the full line position of Fig. 3 to the dotted line position to discharge its contents. In such event, the apron must rise out of the way, and a mechanism to operate the apron automatically from the action of the receptacle will presently be described.

As noted in Figs. 1 and 3, the receptacle is formed with bearings 106 at the front to journal it on a rod 107 supported in frontal uprights 108. Thus, the receptacle employs the rod 107 as a pivot; and a suitable cable tackle mechanism 109 is applied to the rear of the receptacle in order that it may be lifted as mentioned.

The purpose of swinging the receptacle 104 as just described is to discharge its contents forwardly into a sack 110 or other suitable container in which the material will be kept or sold. Accordingly, the sack is suspended from the top sections 111 of a pair of V-shaped brackets 112. The top sections of these have rear hooks 113 engaging the pivot rod 107; and the lower ends of the brackets 112 are offset to bear against a bottom frame rail 114. The brackets are not secured to the parts they engage so that they may be slid therealong to separate or gather them to fit sacks of different widths. It is preferable to place a collar-like guide 115 over the mouth of the sack in order to prevent lateral dissipation of the material poured from the hopper into the sack.

Figure 2:
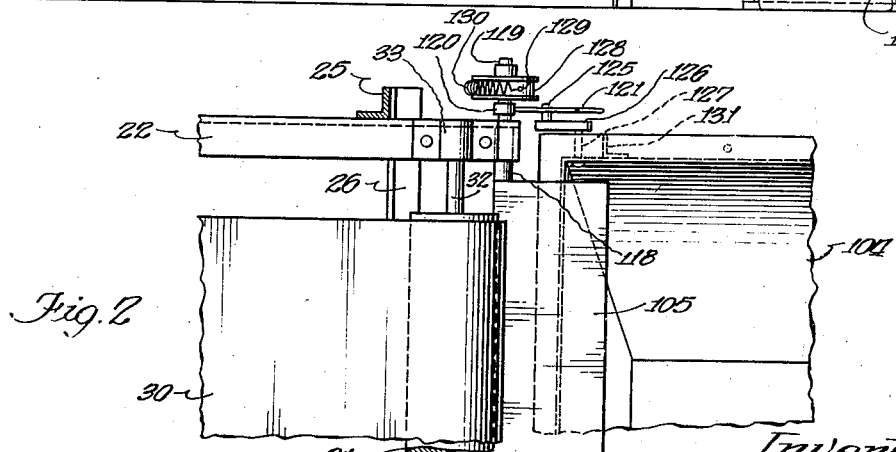
Fig. 2 is a partial top plan view of Fig. 1, on an enlarged scale.

The mechanism for the apron 105 will now be described. As noted in Figs. 2 and 4, the apron is enlarged with a hub 118 which is journaled in the frame member 22 and extends rearwardly with a spindle 119. The latter carries a collar 120 from which are extended upper and lower wire rods 121 and 122, the rod 121 terminating with an upwardly flared portion 123, and the rod 122 terminating with a downwardly deflected portion 124. The wire rods 121 and 122 are adapted to receive between them a side pin 125 projecting from the upper portion of a link 126 whose lower portion is secured by a pin 127 to the rear of the receptacle 104. The spindle 119 also carries a pulley 128 over whose periphery is secured at 129 the upper end of a coil spring 130, the lower end of the latter being secured to a frame extension 130a. The pin 127 normally is positioned alongside a vertical angle bar 131 whose upper end portion curves away from the pin as indicated at 132.

It has been mentioned that the receptacle 104 is pivoted at its frontal edge. Therefore, when it descends from the elevated position, the pin 127 is guided by the angle bar 131 to lend the side of the receptacle a true vertical course of descent as well as to keep the same at the proper distance from the apron 105. When the receptacle is down, as indicated in Fig. 4, the pin 125 of the link 126 maintains the apron in the deflected position relative to the receptacle, so that any material falling from the top run of the conveyor belt 30 will slide down along the apron into the receptacle. The apron is held down against the tension of the coil spring 130. However, when the receptacle is raised, the pin 125 bears on the wire rod 121 to raise the apron to the upper dotted line position, so that the receptacle will clear the apron on its ascent. The spring 130 now maintains the apron in the elevated position. However, when the receptacle is again lowered, the pin 125 meets the deflected end portion 124 of the wire rod 122 and bears upon the latter to swing the assembly of the wire rods and apron outwardly, so as to ultimately restore the apron to the deflected position overlying the entrance to the receptacle. Thus, the apron both forms a bridge for the passage of the material from the conveyor into the receptacle, and is automatically raised out of the way when the receptacle rises to discharge its contents.

Where the installation provides a bottom pit or recess under the receptacle for the discharge of its contents, the raising operation of the receptacle is not utilized. Thus, a slide in the bottom of the receptacle may be shifted to create a direct discharge opening into the recess below the receptacle.

It will be evident from the above description that I have provided a collecting unit which is intimately associated with the fertilizer conveyor, yet causes the connection to move out of the way when the receptacle is moved for the discharge of its contents. The mechanism involved is automatic in its operation, requires no adjustment or attention, and will operate efficiently over a long period of time.

I claim:

A material delivery from the end of a conveyor into a receptacle adjacent such end comprising a shaft below the conveyor, an apron extending inclinedly from the conveyor to a position over the interior of the receptacle, the apron having a hub fast on said shaft, a drum mounted on the shaft beyond one end of the apron, a spring attached over the periphery of the drum and having a tendency to rotate the same in a direction to raise the apron from its inclined position, said receptacle being movable between a raised and a lowered position, said receptacle including an extension, a second extension fixedly associated with said apron, said extension of said receptacle being engageable with said extension of said apron to move said apron to the inclined position as said receptacle is moved to the lowered position.

HUGO M. DANKER.